Jan. 16, 1962     C. B. CASE     3,016,629
GLOBE OVERLAYS
Filed Sept. 29, 1958
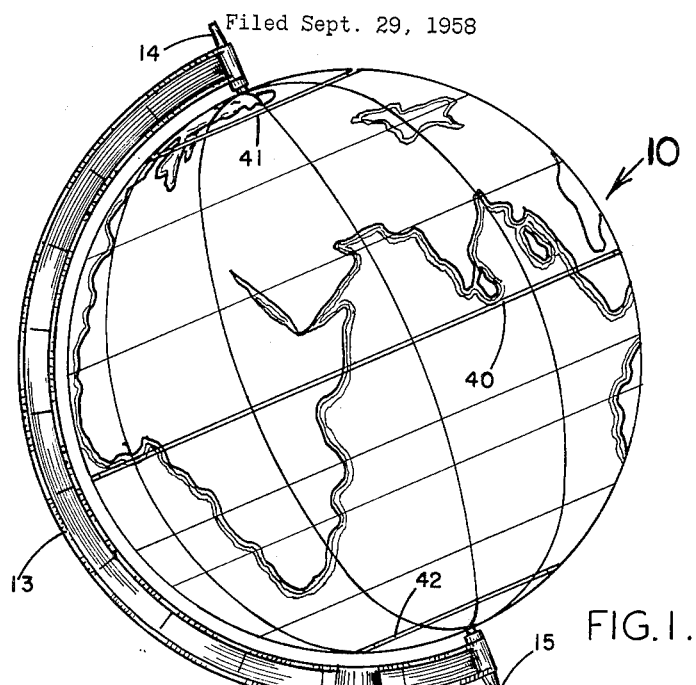
FIG. 1.
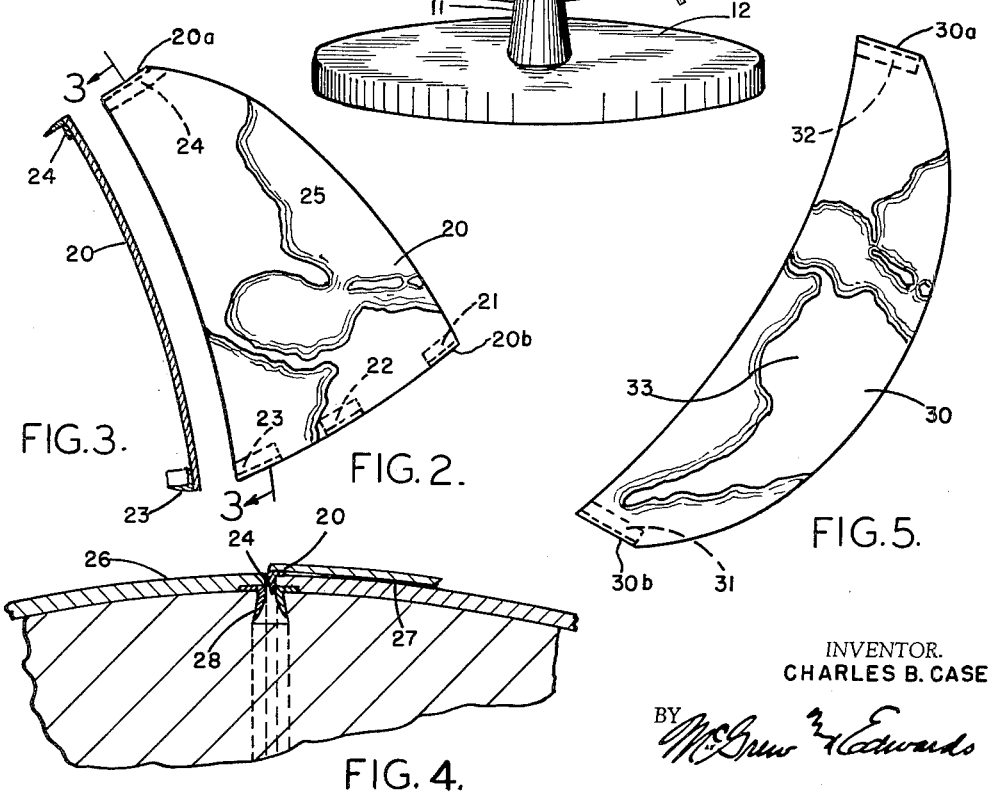
FIG. 3.
FIG. 2.
FIG. 4.
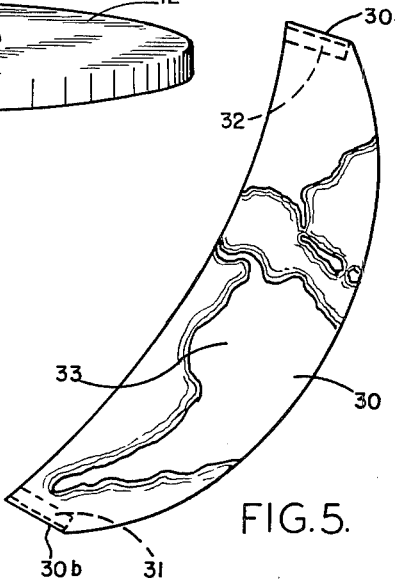
FIG. 5.
INVENTOR.
CHARLES B. CASE
BY *McGrew & Edwards*
ATTORNEYS

United States Patent Office 3,016,629
Patented Jan. 16, 1962

3,016,629
GLOBE OVERLAYS
Charles B. Case, 913 Humboldt St., Denver 18, Colo.
Filed Sept. 29, 1958, Ser. No. 764,042
8 Claims. (Cl. 35—46)

This invention relates to improvements in geographical implements, and more particularly it relates to readily mounted and detachable globe overlays for geographical globes and the like.

The teaching of geography, paleontology, terrestrial navigation, cartography, and the like is more easily accomplished and is more easily understood by students with direct reference to a globe so as to directly demonstrate on curved surfaces. Such subjects cannot be adequately taught by reference to flat maps as there is considerable distortion in any type of flat map and the actual problems involved cannot be clearly presented. In teaching history, geography, and even terrestrial navigation, changes in national boundary lines becomes an important feature. Obviously, a world globe with a single map imprinted on its surface cannot adequately show changes of national boundaries, which are essential in the teaching or the study of such subjects. Such a globe is not feasible for indicating changes in land masses.

Included among the objects and advantages of the present invention is to provide global overlays which may be readily mounted on and detached from globes, providing greatly expanded uses of cartographic globes. The overlays of the invention may be made in various sizes for covering specified portions of the globe, and they may be made of translucent material and provided with maps, outlines, and the like demonstrating changes in national boundaries, land masses and the like. The device of the invention provides an inexpensive and simplified means for indicating a variety of changes in the basic representations on a globe whereby a single globe may be used for different types of such changes. The device of the invention provides a system substantially changing the utility of globes, wherein sets of readily mountable and detachable overlays may be provided to illustrate multiple changes of the basic representation on the globe.

These and other objects and advantages may be readily ascertained by referring to the following description and appended illustrations, in which:

FIG. 1 is a perspective view of a globe illustrating the practice of the invention;

FIG. 2 is a perspective view of one form of overlay illustrating a means for attachment of the overlay to a globe;

FIG. 3 is a cross-sectional view of the overlay of FIG. 2 taken along section lines 3—3;

FIG. 4 is a cross-sectional view of a portion of the globe illustrated in FIG. 1 showing one method of attachment of the overlays to such a globe; and FIG. 5 is a perspective view of a modified overlay section for attachment to a globe.

In the device illustrated in FIG. 1 a globe, shown in general by numeral 10, is mounted on a stand which includes a base 12 having an upright support 11 mounted thereon. A meridian arm 13 is slidably mounted in the support 11 to permit the axis of the globe to be tilted, as is common practice with such devices. The globe is cradled in the meridian arm 13 and is rotatably mounted therein on pole axes 14 and 15. The globe 10 may be any well known type such as glass, plastic, sheet metal, etc. These globes include maps or representations of the land masses and water areas of the world, and they also may include representations of latitude and longitude lines as illustrated. For holding overlays on the globe, slot 40 around the equator, north polar slot 41 and south polar slot 42 are built into the assembly, as will be explained below.

In one preferred form, the overlay is made as a regular geometrical portion of the earth's surface. For example, as illustrated in FIG. 2, the portion is a segment of an upper quadrant approximating one-eighth of the northern hemisphere of the globe. The overlay 20 includes an upper hook 24 mounted adjacent edge 20a and three lower hooks 21, 22 and 23 mounted along equatorial edge 20b of the segment. As shown in FIG. 3, the hooks extend inwardly from the inner surface of the segment in position to be engaged with the northern polar slot 41 and the equatorial slot 40 on the globe, and be removably held in position thereon.

In a preferred form, the segment 20 is a transparent, stiff plastic member curved to substantially the curvature of the globe on which it is to overlay. The radius of curvature of the segment 20 may be slightly less than the radius of curvature of the globe so that the segment will be under spring tension when the hooks are mounted in the slots on the globe, or the hooks may be bent slightly together to provide a secure hold. The segment 20 is also preferably made of a clear, transparent plastic, for example a methacrylate, sheet, with a cartograph of the particular globular segment imprinted thereon. With the transparent plastic overlay the map on the base globe will show through the overlay, illustrating the particular change. In some instances a translucent overlay may be used, particularly where the globe is illuminated by an interior light.

Where the overlay is to show changes in geology rather than political boundaries, the land masses and the water areas may, of course, be represented on the overlays to show the changes for specific geological time areas. It is, also, preferable to have the map on the overlay imprinted on the inside surface so that the outside may be used for drawing as by chalk, crayon and the like, to illustrate additional changes.

Thus it may be seen that the overlays 20 which are segments of a particular hemisphere may be packaged in sets, as for example, a complete globular overlay, or merely a portion of the globe. It is also obvious that the segment may be made of different sizes than the segment shown; for example, each segment may be made as a sixteenth or even a half of the hemisphere. The size of each segment will normally be dependent on the size of the globe, and the area desired to be overlayed. If the overlay segments are too large, storage and possible damage to them are problems which may be diminished by reduced sizes of the segments. The segments are, however, preferably made as large as practical to hold the number to a minimum, thus reducing the actual labor and time of mounting and dismounting them on the globe.

The segment of FIG. 5 illustrates a substantially lune shaped, pole-to-pole overlay portion rather than a segment of the northern or southern hemispherse of the globe. With such a segment the equatorial slot 40 may be eliminated since hook 31 adjacent to the southern pole edge 30b and hook 32 adjacent to the northern pole edge 30a mount in the respective slots 41 and 42 near the poles. The segment 30 is preferably made of a relatively, stiff, clear plastic having imprinted thereon the desired representations, as for example an outline of land masses. Thus this great circle lune segment extends generally from pole-to-pole since its edges are great circle curves which intersect at the poles. Where the globe is used for navigation training, it may be desirable to extend the edge to substantially a point where it will meet the pole axes and provide a substantially smooth surface over which various polar routes of navigation may be plotted. This is easily accomplished by extending segment beyond the polar edges.

The width of the segment 30, e.g. the maximum width at the equator between the great circle configuration of the edges will be determined by the size of the globe and the particular overlay itself. If the overlay becomes too large, storage and damage are substantial problems, while if the segments are too narrow, the use thereof becomes complicated. With a normal 18-inch globe, six or eight segments are generally satisfactory to accomplish the results desired for a particular overlay, whether it is used to illustrate changes of political boundaries, geological changes of land masses, or merely for navigation training or plotting routes on a globe.

Since the device of the invention is an overlay for a globe, the segments are preferably transparent or translucent so that the base representation on the globe may be viewed through the overlay and desired changes thus indicated. An opaque overlay does not permit the map on the globe to be seen, and such an overlay has very little value as such.

There are, obviously, other means of securing the overlays to the globe, but the scope and the spirit of the invention are intended to include obvious and equivalent means for such attachment. For example, instead of the continuous grooves for accommodating the hooks, a series of narrow slots may be extended around the globe in position to mesh with the hooks on the overlays. Thus a differential spacing of the slots provides a means for positive placement of the overlays. Furthermore, a variety of means may be used to identify various segments with their specific position on the globe so that the overlays may be easily and quickly mounted in correct position on the globe.

While the invention has been illustrated with reference to a particular showing, there is no intent to limit the spirit or scope of the invention to the precise details so set forth except insofar as defined in the following claims.

I claim:

1. In combination with a globe having cartographic representations thereon, a plurality of uniform size segments arranged to overlay a surface area of the globe, each said segment being of a size and shape to cover a predetermined regular geometrical portion of the globe, each overlay having representations thereon arranged to register with at least a portion of said cartographic representations of the globe, said segments being substantially stiff members and being substantially transparent so as to display therethrough representations on the globe, and means for releasably securing each segment substantially in contact with the globe surface and in its respective position on said globe.

2. In combination with a globe having cartographic representations thereon, a plurality of uniformly dimensioned segments arranged to overlay surfaces of the globe, each said segment being arranged to cover a predetermined regular geometrical portion of the globe, and abut adjoining members to form a continuous overlay, each overlay having representations thereon arranged to register with at least a portion of said cartographic representations of the globe, said segments being substantially stiff members of substantially the same radius of curvature as the globe and being essentially transparent so as to display therethrough representations on the globe, and mean for releasably securing each segment substantially in contact with the globe surface and in its respective position on said globe.

3. In combination with a globe having cartographic representations thereon, a plurality of overlay segments arranged to sequentially overlay adjacent surfaces of the globe, said segments being substantially uniform in dimensions and each arranged to cover a predetermined regular geometrical portion of the globe, each overlay having representations thereon arranged to register with at least a portion of said cartographic representations of the globe, said segments being a substantially stiff plastic sheet members of substantially the same radius of curvature of the globe and being essentially transparent so as to display therethrough at least a portion of the representation on the globe, there being cartographic representation imprinted on the inner surface of each said segment substantially in contact with the globe surface, and means for releasably securing each segment in its respective position on said globe.

4. In combination with a globe having cartographic representations thereon, a plurality of overlay segments arranged to sequentially overlay adjacent surfaces of the globe and form a smooth overlay surface, said segments being substantially uniform in dimensions and each arranged to cover a predetermined regular geometrical portion of the globe, each overlay having representations thereon arranged to register with at least a portion of said cartographic representations of the globe, said segments being essentially stiff, resilient plastic sheet members having a radius of curvature only slightly less than the globe and being essentially transparent so as to display therethrough a portion of the representation on the globe, there being cartographic representation imprinted on the inner surface of each said segment, and means for releasably securing each segment substantially in contact with the globe surface under tension and in its respective position on said globe.

5. The combination of claim 4 in which the means for releasably securing each segment includes a releasable catch member adjacent opposed ends of the segment securable to the globe and mounted so as to maintain the segment under tension.

6. In combination with a globe having cartographic representations thereon and a plurality of annular spaced slots extending circumferentially therearound, there being at least one slot adjacent each polar region and the equator of the globe, a plurality of overlay segments arranged to substantially contact and sequentially overlay surfaces of the globe forming a cover therefor, said segments being substantially uniformly dimensioned sheets and each arranged to cover a predetermined regular geometrical portion of the globe in abutting relation with its adjoining members, each overlay having representations thereon arranged to register with at least a portion of said cartographic representations of the globe, said segments being substantially stiff members of substantially the same radius of curvature of the globe and being essentially transparent so as to display therethrough said cartographic representations on the globe, and hook means secured to opposed edges of each said segment in position to engage the slots on said globe so as to releasably secure the overlay segments thereon.

7. The combination of claim 6 in which the globe has at least one slot adjacent each polar region and the segments are essentially great circle lune shaped to extend substantially from pole-to-pole.

8. The combination of claim 6 in which the globe has at least one slot adjacent each polar region and one substantially on the equator, and the segments are regular geometrical portions of a hemisphere extending from a pole to the equator, and each segment includes hook means along the polar edge and the equatorial edge in position to mount in said slots and be held under tension therein.

References Cited in the file of this patent

UNITED STATES PATENTS

| | | |
|---|---|---|
| 173,988 | Nichols | Feb. 22, 1876 |
| 379,915 | Story | Mar. 20, 1888 |
| 887,740 | Phillips | May 12, 1908 |
| 1,629,582 | McClintock | May 24, 1927 |
| 1,808,354 | King | June 2, 1931 |
| 2,175,239 | Amdur | Oct. 10, 1939 |
| 2,369,103 | Clark | Feb. 6, 1945 |
| 2,422,101 | Johannsen | June 10, 1947 |
| 2,809,448 | Oestergaard et al. | Oct. 15, 1957 |
| 2,879,614 | Baldanza | Mar. 31, 1959 |